2,785,979

PROCESSES FOR PREPARING TEA PRODUCTS

George F. Mitchell, Woodmere, N. Y.

No Drawing. Application April 14, 1954,
Serial No. 423,223

8 Claims. (Cl. 99—77)

This invention relates to a process for preparing beverage products, and the resulting products. It is more particularly directed to processes for making beverage products from materials such as cured tea (*Thea sinensis*), and cured maté (*Ilex paraguayensis*), and the resulting products. The finished products may be in the form of extracts, syrups and dry concentrates to be used in preparing hot or cold drinks as well as carbonated soda fountain and beverage dispenser drinks or carbonated and still (non-carbonated) bottled drinks, as described more fully below.

For many years, attempts have been made to produce satisfactory liquid and solid beverage products from the above sources for bottling and packaging, respectively, but the liquid products become oxidized and darken on standing. They also deposit a sediment or form a suspension on standing and lack the full aromatic flavor of the tea and maté from which derived. Furthermore, such products frequently become cloudy when chilled or iced.

The dried powders, such as tea powders now on the market, also lack such full aromatic flavor and, in addition, are difficultly soluble in cold water. Thus, for preparing cold drinks from such products, it is necessary to dissolve them in hot water and then to cool this down by icing.

It is the principal object of the present invention to provide a simple, economical process for producing such products which shall do away with at least some of the above disadvantages and to produce products which shall be sparkingly clear as cold drinks and which shall have all of the richness of palatable flavor of the substances from which prepared.

The invention accordingly comprises the novel products as well as the novel processes and steps of processes according to which such products are manufactured, the specific embodiments of which are described hereinafter by way of example and in accordance with which I now prefer to practice the invention.

As a result of my years of experience in growing tea and other like materials and manufacturing beverage products, including chemical control of such products in the laboratory, I have found in accordance with my invention that raw tea and maté contain tannins and albuminoids which can be removed to improve the properties of the beverages obtained therefrom. It is well known that several tannins occur in tea and maté in different degrees of solubility. In addition, they both contain ingredients producing their characteristic aroma and both of them contain the alkaloid caffeine.

From my experience as a tea expert and from chemical analysis that I have made I find that most of the caffeine, nearly all of the real tea flavor and a substantial amount of tannins and proteins which produce substantially no cloudiness in extracts are extracted in cold water at room temperature or below and not above 26.5° C. (about 80° F.) especially, if the extraction of the leaves is done by circulating the water under pressure or by forcing the water up through the tightly compact leaves or drawing the liquid down through the tightly compact leaves or both in a percolator or series of connected percolators. I have also found in accordance with my invention that before extracting the leaves they should be pasteurized or preferably sterilized in live steam to destroy mold spores and bacteria that might be present and to inhibit oxidative changes from oxidizing enzymes. This steaming which is best accomplished in an autoclave under pressure opens up and softens up the leaves making extraction in cold water easier and more productive of cold water extract.

Step 1.—After the leaves are steamed they should be cooled immediately or refrigerated to avoid stewing. The water used in this cold water extraction should always be boiled and cooled to the desired temperature as it is important that the extraction be done under the most sterile conditions. It is so important to prevent oxidation that it is preferable to add a small amount of anti-oxidant to the water used in extracting to still further safeguard against oxidation. Any oxidation, no matter how small, will detract from the desired original color of the extract and from the original pungency of the liquor. This cold water extract which comprises step #1 should be flash sterilized or held under refrigeration for aromatizing the total extract.

The leaves now deprived of all or nearly all of the cold water extractives but still containing other desirable constituents soluble in hot water must be further treated under step #2. Step 2.—However, experience has shown that the acid insoluble tannins and albuminoids extracted in hot water unless removed will cause a sediment or form a suspension on standing and become cloudy when chilled or iced and the dried powders produced from the extracts are difficultly soluble in cold water. These acid insoluble albuminoids and tannins also have a masking effect on the taste of the beverages prepared from the above product and they also have an effect on the aroma since when removed, the aroma is improved. Therefore, in extracting the leaves under step #2 I use the same amount of water as in the first step but the water is at a temperature between 75° to 90° C. and acidulated to a pH not over pH 4. Instead of extracting with acidulated water the extraction can be made with water at the above temperature and acid later added to the extract to precipitate and remove the acid insoluble tannins and proteins. However, I find the first method preferred since the acid fixes most of the acid insoluble tannins and proteins on or in the leaf and most of them do not get into the extract. When the acid is added to the extract afterwards there is produced more solids in the extract, but when these acid insoluble tannins and proteins are filtered out they make filtering more difficult and costly. This would also be true in any other removal method such as centrifuging, etc. To increase the solids in the extracts the second step may be repeated on the leaves by using one-half of the amount of water acidulated to pH 4 before extracting or after extracting as suggested under the alternative process of second step above.

Step 3.—To still further increase the solids in the total extract I find that if the residue from step 2 is placed in a Pyrex jar or stainless steel receptacle and water added acidulated to pH 4 and the jar sealed and heated in an autoclave to 15 lbs. gage pressure for 5 minutes soluble material in the cells of the leaves that were not extracted under step 2 will be extracted. After straining and pressing all of the extract from the leaves it can be added to the extract from step 2 before filtering. The efficiency of step 3 can still further be aided if the residue from step 2 is put through a meat chopper to break the cells. This is especially advisable in the case of maté.

In steps 2 and 3 a cheaper tea or even the dust or fluff may be added to the tea or maté with a proportionately larger amount of water to increase the amount of solids at less expense. Finally all the extracts are combined to be used to produce a more concentrated extract under reduced pressure or to be brought to dryness under reduced pressure to produce tea or maté powders or to make tea or maté powders by spray drying or drum drying or to make tea or maté syrups of any degrees Bé., by adding sugar.

I have also found in accordance with my invention that the tannins in green teas are not oxidized or only slightly oxidized and therefore when these teas are used alone or with black teas the solids in the extract will be increased after the acid treatment. This is also true of oolong teas, but to a lesser degree, since oolong teas are partially oxidized and there are more acid insoluble tannins and proteins to be removed than in green teas but of course not as much as in black teas, oolong teas being only semi-oxidized or fermented during curing or manufacture.

In selecting teas or maté for making extracts, syrups or powders one must be careful not to select black teas that are over-oxidized if this type of tea is to be used as there will necessarily be more acid insoluble tannins to remove in steps 2 and 3 of the process, thereby reducing the water soluble solids in the extract. Select only black teas with bright infused leaves, because if the infusion or infused leaves are of a dark copper color it is indicative that the tea has been over-oxidized during curing which means there will be a greater percentage of insoluble substances in the leaf.

The following are examples of the manner in which I now prefer to carry out the process of my invention and of the preferred resulting products. It is to be understood that these examples are illustrative and that the invention is not to be restricted thereto except as indicated in the appended claims.

*Example 1*

This example is divided into three steps which were carried out as follows: *Step 1.*—One-half pound of commercial tea was treated with live steam preferably in an autoclave for about 5 minutes under from 10 to 15 lbs. pressure. Better and quicker results are obtained if the tea is slightly moistened. The autoclave is then cooled and the tea removed and cooled by refrigeration or by aeration or any suitable means. The tea was then placed in a clean sterilized Pyrex percolator fitted at the outlet end on the inside with an 80 mesh to the inch stainless steel wire screen disc. After covering the top of the percolator with a cap made of sterilized cheese cloth it was inverted into a stainless steel bain-marie or water bath into which it fitted perfectly. Then I placed in the bain-marie surrounding the inverted percolator one quart of previously boiled cold water not above 26.5° C. (about 80° F.). The outlet end of the percolator was connected with a Pyrex filter flask which in turn was attached to an exhaust pump furnishing about 14 lbs. pressure to the square inch. Each time the liquid was pumped through the tea it was returned for percolation and pumped through the tea until the cold water extraction was completed which I found varied slightly if different teas were used and especially if the tea being percolated was of a different size. Usually 8 or 9 circulations of the liquid through the tea is sufficient. The cold water extract was then flash sterilized or refrigerated to produce an aromatic extract to be used in aromatizing the total extract. It amounted to about one pint.

*Step 2.*—Consists in percolating the tea-residue remaining in the percolator with one quart of water at 80° C. acidulated to pH 4 with citric acid or one of the potable acids described below. The upper container carrying the percolator was placed in a water bath and the water bath brought to a gentle boil. One quart of water 80° C. acidulated to pH 4 was used to extract the tea. Each time that the extract was returned, the pump was cut off to allow the extract to heat up to 80° C. before circulating it through the tea. As soon as the extract ceases to build up, after 4 circulations usually, it is put under refrigeration to await the result of step 3.

*Step 3.*—The percolator tea-residue is then emptied into a Pyrex jar and after adding one pint of water acidulated to pH 4 with citric acid, the jar is heated in an autoclave under 15 pounds gauge pressure for 5 minutes, and after cooling the extract is pressed out and added to the extract from step 2, and after filtering at room temperature extract of step 1 is added. Thus the three extracts are united. The total extracts consist of two quarts which was divided and half made into syrup and the other half dried at reduced pressure to produce a powder soluble in cold or hot water. The dried powders will vary in color according to the type of tea used. Green oolong and black teas will produce characteristically greenish amber, reddish amber and reddish brown colored products, respectively. Each of the products has a bitter taste and a strong tea taste and odor. They are readily soluble in cool water or hot water.

*Example 2*

Especially for iced tea syrups. *1st step.*—Place in an autoclave one-half pound of cheap black tea of low aroma with 3 quarts of water and extract for 5 minutes under 15 lbs. gauge pressure. After steaming there will be left 2½ quarts of liquid tea. To one quart add 100 grams of sugar and 1 oz. of lemon juice or lemon concentrate to make pH 3.5. To the remaining 1½ quarts add sufficient lemon juice or lemon concentrate to make the extract pH 3.5. After both batches have cooled to room temperature, filter separately and reduce the 1½ quart batch in open pan over double boiler to 8 oz. Add the two together and hold for second step.

*2nd step.*—Place in 1 qt. Pyrex jar ½ lb. flavory tea (in this case oolong) and 8 oz. water. Heat in autoclave for 5 minutes at 15 lb. pressure. Transfer to inverted percolator as described in step 1 Example 1 and treat with the 1½ quarts of the combined extracts of step 1 of this Example 2, until extraction at room temperature is complete. Weigh and add 1/10 of 1% of benzoate of soda and 3 grains of ascorbic acid dissolved in hot water as stabilizer. The tea syrup produced has a fine aroma and body and is highly palatable.

The above process may be carried out in exactly the same way on maté, substituting the latter for tea.

*Example 3*

*Step 1.*—Eight ounces of toasted maté or untoasted or regular maté is placed in a large bowl or suitable receptacle and thoroughly rinsed in cold water of many times the volume of the maté to cleanse it of all smokiness. Immediately the water is strained off and the damp leaves sterilized in live steam, preferably in an autoclave for 5 minutes at a pressure of 15 pounds' gauge pressure. After cooling the autoclave and removing the maté the maté is cooled by refrigeration. The maté is then placed in a sterilized Pyrex percolator fitted at the outlet end on the inside with a 80-mesh-to-inch stainless steel screen disc. After covering the top of the percolator with a cap of sterilized cheese cloth, the percolator is inverted in a stainless bain-marie into which it fitted perfectly. I then placed in the bain-marie, surrounding the inverted percolator, one quart of previously boiled cold water in which had been dissolved an anti-oxidant (in this case I used about three grains of ascorbic acid to the quart of water). The water used in this first step was 20° C. The outlet end of the percolator was connected with a Pyrex filter flask which in turn was attached to an exhaust pump furnishing about 14 pounds' pressure to the square inch. During percolation the pressure varied from a few pounds up to 14½ pounds per square inch, but averaged about 13 pounds, which made the total pounds' pressure more than 180 pounds as the percolator was 4¼ inches in diameter. Each time the liquid was pumped through, it was returned to be pumped through the percolator until the cold water extraction was completed. About 4 or 5 circulations were made. The cold water extract was then refrigerated to be used in aromatizing the total extract. It amounted to about one pint.

*Step 2.*—Consists in percolating the maté residue remaining in the percolator with one quart of water at 80° C. acidulated to pH 4 with citric acid. The upper part of the bain-marie carrying the inverted percolator was then placed in a water bath and the water bath brought to a gentle boil and the water circulated. Each time the extract was returned for percolation, the pump was cut off to allow the extract to heat up to about 80° C. before circulating it through the maté. As soon as the extract was clear and ceased to build up, after 4 circulations it was put under refrigeration to await the result of step 3. The extract under step 2 amounted to about one quart.

*Step 3.*—The contents of the percolator are then run through a meat chopper and placed in a Pyrex jar and after adding one pint of water acidulated to pH 4 with citric acid, the jar was heated in an autoclave under 15 pounds' gauge pressure for 5 minutes. After cooling the extract is pressed out of the leaves and added to extract from step 2, and after filtering the three extracts are brought together and will consist of about 2 quarts, which can be used in making syrups or dried under reduced pressure, spray dried or drum dried, to produce maté powders. The dried maté concentrate is bitter in taste, reddish brown in color, and has an odor and taste of maté. I prefer to employ citric acid or lemon concentrate where it is to be served for cold drinks. In making all dried concentrates, if it is so desired, carbohydrates such as sugars may be intermixed with the extract before drying, but I prefer to use them without carbohydrates. All extracts and syrups when reduced to potable strength are clear and transparent in color.

The acids preferably used by me to change the pH of the infusion into the range of about pH 2 to pH 4 in the above examples are phosphoric acid, citric acid, malic acid and tartaric acid. These are all recognized as potable acids. Other potable acids may be used. Hydrochloric and sulphuric acid will give the desired pH and cause coagulation or precipitation of substances from such infusion. The latter two may be used if there is no objection to their potability. Phosphoric acid, because of its cheapness, has some advantage, but cannot be used where the concentrate or extract is to be reduced to a soluble powder. There any of the other potable acids should be used in equivalent amounts.

In step 1, I use cold water or water at room temperature, because from my experience and from chemical work I have done on tea in the past, I have found that caffeine is much more soluble than tannin and is extracted in cold water along with the aroma compounds and with only a small amount of the less astringent tannins. Caffeine is first removed. Then in step 2 in which I heat, add acid and filter, the tannins are largely absent in the filtrate. Then the cold water extract high in caffeine is mixed with this extract of step 2. I may use the extracts of steps 1 and 2 as a final product if desired, but prefer to also add the extract from step 3.

In step 3 there is still left in the leaf cells unoxidized tannins and other constituents, other than caffeine which are extracted under pressure and higher heat and which when added to the extracts from which the tannins have been removed add to the body of the resultant tea and maté extracts syrups and solubles. Caffeine in tea besides being more soluble in cold or hot water than tanning is localized in the epidermis of the leaf while the tannins are not so localized.

By this process the dried or concentrated liquids or syrup lose some of their color. However, this may be replaced by caramel or certified food coloring to standardize the color of the resultant product.

I may make mixtures of beverages in accordance with my invention, for example, the base for a tea extract may be prepared from either regular or toasted maté in accordance with Example 2, by eliminating the cold water extraction in step 1, and extracting with hot water acidulated to pH 4 at 80° C., as in step 2. Then continuing as in step 3, adding extracts from steps 2 and 3, and after filtering, using this combined extract to extract tea as in Example 1. The result will be a much cheaper extract with a tea taste and flavor overtone that can be used as a mixed extract or made into syrups or soluble powders as above described. I have also prepared extracts from tea in accordance with the above examples which are then flavored with cola to produce cola drinks of superior color and body. These drinks naturally contain caffeine, derived from tea or maté and may be used as extracts, syrups, or even dried powder in preparing drinks and, of course, reduces the cost of transportation when shipped. Other true and synthetic extracts may be used instead of cola in such mixtures. Such mixtures may aid in reducing the cost of preparing products in accordance with my invention. Thus, maté or pure dust of tea or cheap varieties of tea, may be used for preparing extracts as I have described above, which in turn may be used in the extraction of fine and flavory teas to produce a mixed product or a straight tea product of superior quality. I again stress that when using cheap varities for reducing cost of either of these products they naturally have to be employed with finer qualities of the same material.

Extracts or syrups intended for soda fountain or bottled drinks may be used with a pH even as low as about pH 2. However, this is not advisable where the products are to be served with milk or cream.

In localities where the water is not of good quality for infusing tea and maté in homes or restaurants, my infusions put up in bottles are an advantage since these infusions are prepared in beverage bottling plants which use a rectified water. Such bottled infusions therefore are of standard and better quality than could be obtained by using a poor quality water of the locality.

All of the various dried concentrates prepared in accordance with my invention dissolve most readily in cold water, which renders them more convenient for use and enhances the commercial value. All the liquid products herein mentioned may be bottled in carbonated form if desired.

Any leaf grade of tea or maté may be used in preparing these extracts, but experience has shown that better results are obtained when the tea is of the size known in the trade as orange fannings or pekoe fannings or siftings. In the case of maté the conventional size common in the trade is satisfactory, although this might be improved by grinding it so as to go through a ten-mesh sieve. However, this is not necessary where we in the third step in the second example put the maté through a meat chopper before extracting in the autoclave. Since maté is not rolled like tea to break the cells to spread the juice on the outside of the leaves, forcing them through the meat chopper breaks the cells and gives more body to the resultant extract.

What I claim is:

1. A process, which comprises preparing a cold water extract of a substance selected from the group consisting of tea and maté to produce such extract and a first residue, treating said first residue with acidulated hot water having a pH of not over about 4 to produce a second residue and extract and treating the second residue with acidulated water under high temperature and high steam pressure to produce a third extract and residue and combining the three extracts.

2. A process in accordance with claim 1 in which prior to the first extraction the substance is treated with high pressure steam to sterilize same.

3. A process in accordance with claim 1 in which the combined extracts are evaporated to produce a stable syrup.

4. A process in accordance with claim 1 in which the acid used for acidification is selected from the group consisting of phosphoric, citric, malic and tartaric acid.

5. A process in accordance with claim 4 in which the acid used is an acid which is solid on drying and the material is evaporated to form a dry water soluble product.

6. A process, which comprises preparing a cold water extract of a substance selected from the group consisting of tea and maté to produce such extract and a first residue, treating said first residue with acidulated hot water having a pH of not over about 4 to produce a second residue and extract filtering said second extract and combining the first and second extracts.

7. A process which comprises treating tea with cold water to produce an extract and a first residue, treating said residue with acidulated hot water having a pH of not more than pH 4 to produce a second acid extract, filtering said second extract and combining the first and second extracts.

8. A process which comprises treating tea with cold water to produce an extract and a first residue and treating said residue with acidulated hot water having a pH of not more than pH 4 to produce an acid extract.

References Cited in the file of this patent

UNITED STATES PATENTS

| | | |
|---|---|---|
| 225,185 | Nichols | Mar. 21, 1882 |
| 1,813,120 | Metzger et al. | July 7, 1931 |
| 1,854,062 | Potter et al. | Apr. 12, 1932 |

FOREIGN PATENTS

| | | |
|---|---|---|
| 559,758 | Great Britain | Mar. 3, 1944 |